United States Patent Office 3,007,786
Patented Nov. 7, 1961

3,007,786
USE OF CYCLOHEXYL SUBSTITUTED ALPHA-CHLOROACETAMIDES AS HERBICIDES
Philip C. Hamm, Webster Groves, and Angelo J. Speziale, Creve Coeur, Mo., assignors to Monsanto Chemical Company, St. Louis, Mo., a corporation of Delaware
No Drawing. Filed Feb. 25, 1960, Ser. No. 10,879
13 Claims. (Cl. 71—2.3)

This invention relates to new herbicidal compositions and methods for their use. Although the compounds can be used both in contact application and in pre-emergence procedure, the latter is more significant, since it enables a selective activity on grasses without injuring the broad leaf crop plants.

Many chemical compounds are known to be deleterious to the growth of vegetation and to have herbicidal effects under certain specific conditions; some of these are known to be quite effective at low levels of application. It is, however, a more difficult problem to provide useful herbicides for selective activity on undesirable plants, but which are harmless to other vegetation. Compounds of this type are known, being primarily useful in eliminating broad leaf plants from grasses or grass-like cereal crops. This herbicidal activity is frequently related to the leaf area exposed to the herbicide, the plants with larger leaf areas being more susceptible to the contact herbicides.

In copending applications of earlier date the present applicants have shown that certain alpha-halo-acetamides are excellent herbicides, particularly with respect to grasses. It has also been shown that many near homologues are inactive and that the active compounds have critical molecular configurations which are necessary to produce the desired herbicidal effect. It has been demonstrated that the mono-halo acetyl radical is an essential structure, but not all compounds of this type are active. For example, the mono-halo-acetamide is inactive, but can be converted to an active herbicidal compound by properly substituting on the nitrogen atom. The number and kind of substituents to produce active herbicides have no regular pattern and the classes of compounds which have high degrees of activity are unpredictible and no theory of the herbicidal mechanism has yet been formulated. A few general observations have been made with respect to the limitations in structure and these provide the basis for separate patentability in several copending applications.

The primary purpose of this invention is to provide a new and useful class of herbicides having both contact and pre-emergence herbicidal properties. A further purpose of the invention is to provide selective herbicides capable of destroying grasses in the presence of broad leaf crop plants. A still further purpose of the invention is to provide new chemical compounds having unusual utilities as are hereinafter described more fully.

It has now been shown that compounds containing either cyclohexyl or cyclohexylmethyl substituents on the nitrogen atom are active herbicides although compounds with longer alkyl chains between the nitrogen and the ring structure are completely inactive as are also the compounds containing two of the cyclohexyl alkyl substituents. The derivatives with one or more halogen atoms and or one or more of the short alkyl substituents for example the alkyl radical having one to three carbon atoms also have desirable herbicidal properties. Thus the new class of compounds has the following structure:

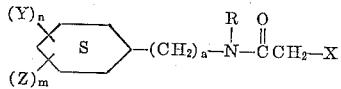

wherein R is a radical selected from the group consisting of hydrogen, alkyl radicals having up to six carbon atoms, alkenyl radicals having up to six carbon atoms, alkynyl radicals having up to six carbon atoms, halo-substituted alkyl radicals having up to six carbon atoms, halo-substituted alkenyl radicals having up to six carbon atoms and halo-substituted alkynyl radicals having up to six carbon atoms; wherein X is a halogen atom; wherein Y is an alkyl radical having up to four carbon atoms; wherein Z is a halogen atom; wherein each of the $n$ and $m$ symbols are integers from zero (0) to five (5) inclusive provided that the sum of $n$ and $m$ does not exceed five, and wherein $a$ is an integer from zero (0) to one (1).

The new class of compounds is prepared by reacting a halo-acetyl chloride with a suitable primary or secondary amine containing the desired configuration substituted on the nitrogen atom. Thus amines such as cyclohexyl amine, cyclohexylmethyl, the substituted amines or mixed secondary amines containing one cyclohexylmethyl or cyclohexyl group and an aliphatic group having up to six carbon atoms may be used. The new compounds are prepared by mixing said amine with an organic liquid such as chloroform maintained in a reaction at temperatures sufficiently low to prevent the evaporation of the amine. It is also desirable to have a strong base present, such as sodium hydroxide. The halo-acetyl chloride is gradually introduced into the said flask until the combination of reagents is completed. The resulting products are separated from the reaction mixture by evaporation of the organic diluent and the purification of the product either by vacuum distillation or by crystallization depending upon the ultimate properties of the products.

Further details of the preparation of the new compounds are set forth with respect to the following examples.

*Example 1*

The reaction flask is charged with 113 parts by weight of cyclohexylmethyl amine, 220 parts by weight of 20% sodium hydroxide in approximately 1400 parts of chloroform. The flask and its contents was cooled at less than −20° C., and 124 parts by weight of chloroacetyl chloride was gradually added thereto over a period of one-half hour, during which reaction period temperatures did not rise above −10° C. The reaction mixture was allowed to stand until the temperature rose to 10° C. The organic liquid was then separated from the aqueous phase and the chloroform evaporated. The white solid product was dissolved in aqueous ethanol and recrystallized. An 88% yield of crystalline product at a melting point of 84 to 84.5° C. was obtained. It was identified as alpha-chloro N-cyclohexylmethyl acetamide.

*Example 2*

The procedure of Example 1 is repeated except that 1,4-di-methyl cyclohexylmethyl amine was used in place of the cyclohexyl methyl amine. The chloroacetyl chloride is added in the presence of an excess of sodium hydroxide in a chloroform medium. A liquid product was obtained at a 53% yield having an index refraction of 1.4938 and identified as alpha-chloro N(1,4-dimethylcyclohexylmethyl) acetamide.

*Example 3*

The procedure of Example 1 is repeated except that 1-methylcyclohexylmethyl amine is used in place of the cyclohexylmethyl amine. The resulting product is a liquid purified by distillation at 15 mm. total pressure at a temperature of 121.5° C. Alpha-chloro N(1-methylcyclohexylmethyl) acetamide is thereby prepared.

Example 4

To a solution of 99.2 g. of cyclohexylamine in 300 ml. of ethylene dichloride cooled to −10° C., there is added with stirring, 66.5 g. of chloroacetyl chloride at −2 to −8° C. during 2 hours. The slurry is stirred for one-half hour after removal of the cooling bath and filtered. The filter cake is a mixture of cyclohexylamine hydrochloride and the desired acetamide. Ethylene dichloride is recovered from the filtrate, washed with water and excess solvent is recovered. The solid residue is combined with the above filter-cake and slurried at 5° C. with 150 ml. of water for one-half hour. The cyclohexyl chloroacetamide is collected by filtration and washed with 200 ml. of water and recrystallized from benzene-Skellysolve B mixture. The product so obtained is identified as alpha-chloro-N-cyclohexylacetamide.

Example 5

Using the procedure of Example 4 except that allyl cyclohexyl amine was used in place of cyclohexylamine, a compound was recovered and identified as N-cyclohexyl-N-allyl alpha-chloroacetamide.

Example 6

By digesting the alpha-chloro-N-cyclohexyl acetamide of Example 4 in acetone solution at reflux temperature for six hours in the presence of an excess of potassium iodide, alpha-iodo-N cyclohexyl acetamide is formed.

The relative value of the above described chloroacetamides and other haloacetamides prepared by analogous methods was determined by planting a large number of seeds of each of several different botanical types and treating the flats with varying concentrations of each of the haloacetamides described. The observed data is set forth in the following table wherein the botanical type is identified by an initial in accordance with the following code:

A _____ Wild oat.
B _____ Brome.
C _____ Rye grass.
D _____ Foxtail.
E _____ Barnyard.
F _____ Crab grass.
G _____ Morning glory.
H _____ Buckwheat.
I _____ Radish.
J _____ Cotton.
K _____ Corn.
L _____ Field bindweed.

The following table of numerals will be used to designate the relative herbicidal effect of the various haloacetamides:

0 _____ No phytotoxicity.
1 _____ Slight phytotoxicity.
2 _____ Moderate phytotoxicity.
3 _____ Severe phytotoxicity.

|   | Rate | A | B | C | D | E | F | G | H | I | J | K | L |
|---|---|---|---|---|---|---|---|---|---|---|---|---|---|
| Alphachloro-N-cyclohexyl-N-methyl acetamide | 25 | 3 | 3 | 3 | ---- | 3 | 3 | 3 | 3 | 3 | 2 | 2 | ---- |
|  | 5 | 3 | 3 | 3 | ---- | 3 | 3 | 1 | 3 | 0 | 2 | 0 | ---- |
| Alphachloro-N-cyclohexyl-N-ethyl acetamide | 25 | 3 | 3 | 3 | ---- | 3 | 3 | 3 | 3 | 1 | 3 | 1 | ---- |
|  | 5 | 3 | 3 | 3 | ---- | 3 | 3 | 3 | 2 | 0 | 1 | 1 | ---- |
| Alpha chloro-N-1,4 di-methylcyclohexylmethyl acetamide | 25 | 3 | 3 | 3 | 3 | 3 | 3 | 2 | 2 | 1 | 0 | 3 | 1 |
|  | 5 | 3 | 3 | 2 | 2 | 3 | 3 | 3 | 0 | 0 | 0 | 0 | 0 |
|  | 1 | 0 | 3 | 2 | 2 | 2 | 3 | 2 | 0 | 0 | 0 | 0 | 0 |
|  | ½ | 2 | 1 | 3 | 3 | 3 | 3 | 2 | 0 | 0 | 2 | 0 | 1 |
| Alphachloro-N-cyclohexylmethylacetamide | 25 | 3 | 3 | 3 | 3 | 3 | 3 | 3 | 1 | 0 | 1 | 0 | 0 |
|  | 5 | 3 | 3 | 3 | 3 | 3 | 3 | 3 | 0 | 0 | 1 | 0 | 1 |
|  | 1 | 0 | 0 | 0 | 0 | 0 | 0 | 0 | 0 | 0 | 0 | 0 | 0 |
| Alphachloro-N-1,3-dimethylcyclohexylmethyl acetamide | 25 | 3 | 3 | 3 | 3 | 3 | 3 | 1 | 0 | 2 | 0 | 0 | 1 |
|  | 10 | 3 | 3 | 3 | 3 | 3 | 3 | 3 | 0 | 0 | 0 | 1 | 0 |
|  | 5 | 3 | 3 | 3 | 3 | 3 | 3 | 3 | 0 | 1 | 1 | 0 | 2 |
|  | 1 | 1 | 3 | 3 | 0 | 1 | 1 | 3 | 0 | 0 | 0 | 0 | 0 |
| Alphachloro-N(2-chloroallyl)N-cyclohexyl acetamide | 25 | 3 | 1 | 3 | 3 | ---- | ---- | ---- | 0 | 0 | 0 | 0 | ---- |
|  | 15 | 1 | 1 | 3 | 3 | ---- | ---- | ---- | 0 | 0 | 0 | 0 | ---- |
|  | 10 | 2 | 2 | 3 | 3 | ---- | ---- | ---- | 0 | 0 | 0 | 0 | ---- |
|  | 5 | 2 | 2 | 3 | 3 | ---- | ---- | ---- | 0 | 0 | 0 | 0 | ---- |
| N-cyclohexyl-alphaiodo acetamide | 25 | 3 | 3 | 3 | 3 | ---- | ---- | ---- | 0 | 1 | 0 | 0 | ---- |
|  | 5 | 2 | 2 | 3 | 2 | ---- | ---- | ---- | 1 | 1 | 0 | 0 | ---- |
| Alphachloro-N-cyclohexyl acetamide | 25 | 3 | 3 | 3 | 3 | ---- | ---- | ---- | 1 | 2 | 1 | 0 | ---- |
|  | 5 | 3 | 3 | 3 | 3 | ---- | ---- | ---- | 0 | 0 | 0 | 0 | ---- |
| Alphachloro-N-allyl N-cyclohexyl acetamide | 25 | 3 | 3 | 3 | 3 | ---- | ---- | ---- | 1 | 2 | 0 | 0 | ---- |
|  | 5 | 3 | 2 | 3 | 3 | ---- | ---- | ---- | 0 | 0 | 0 | 1 | ---- |

Example 7

By analogous procedures other homologues are prepared for demonstrating herbicidal activity of some homologues and complete lack of activity of some homologous acetamides not included as part of this invention. Such In order to demonstrate the critical structure of the compounds used in the practice of this invention, the following table shows the lack of herbicidal properties for homologous compounds not included within the scope of the claims.

|   | Rate | A | B | C | D | E | F | G | H | I | J | K | L |
|---|---|---|---|---|---|---|---|---|---|---|---|---|---|
| Alphachloro-N,N-di(1-methylcyclohexylmethyl)acetamide | 25 | 0 | 0 | 0 | ---- | 2 | 0 | 0 | 0 | 0 | 0 | 0 | ---- |
|  | 5 | 0 | 0 | 0 | ---- | 0 | 0 | 2 | 0 | 1 | 0 | 0 | ---- |
| Alphachloro-N,N-di(cyclohexylmethyl)acetamide | 25 | 0 | 0 | 1 | ---- | 2 | 2 | 0 | 0 | 0 | 0 | 0 | ---- |
|  | 5 | 0 | 2 | 2 | ---- | 2 | 3 | 2 | 0 | 0 | 0 | 1 | ---- |
| Alphachloro-N-cyclohexyl propionamide | 25 | 0 | 0 | 1 | ---- | ---- | ---- | ---- | 0 | 0 | 0 | ---- | ---- |
| Alpha beta di-chloro N-cyclohexyl propionamide | 25 | 0 | 0 | 0 | ---- | ---- | ---- | ---- | 0 | 0 | 0 | ---- | ---- |
| Betachloro-N-cyclohexyl propionamide | 25 | 0 | 0 | 0 | ---- | ---- | ---- | ---- | 0 | 0 | 0 | ---- | ---- |
|  | 5 | 0 | 0 | 0 | ---- | ---- | ---- | ---- | 0 | 0 | 0 | ---- | ---- |
| Alphachloro-N-phenyl acetamide | 10 | 0 | 0 | 2 | ---- | ---- | ---- | ---- | 0 | 0 | 0 | 1 | 0 |
| Monochloracetic acid | 25 | 0 | 0 | 0 | ---- | ---- | ---- | ---- | 0 | 0 | 0 | ---- | ---- |
| Chloroacetamide | 5 | 0 | 0 | 0 | ---- | ---- | ---- | ---- | 0 | 0 | 0 | ---- | ---- | homologues may be N(2,4-dichlorocyclohexyl) alpha-chloro acetamide, N(2-chloro-4-methylcyclohexylmethyl) alpha-bromo acetamide, N(2-chloroethyl) N-cyclohexyl alpha-iodo acetamide, N-isopropyl-N-4-bromocyclohexyl alpha-chloro acetamide.

Valuable herbicidal effects, especially with respect to grasses, will be observed from applications of small amounts, often as low as 0.1 pound per acre as well as at higher concentrations, for example 100 pounds per acre. The selective activity on grasses is more pronounced at lower levels of application, for example from one to 15 pounds per acre. At heavier levels of application, for example 10 to 50 pounds per acre, the selectivity is less pronounced and the general herbicidal effects are obtained.

To obtain the general herbicidal effects, application may be made by spraying the foliage of a growing plant. The selective activity is observed by preemergence application by spraying the compound or formulations thereof on the soil surface either prior to or subsequent to the planting of the seed. The preferred method is to plant the seed first and spray the surface with a formulation of the compound which will permeate the top soil layer and destroy the grasses by contact either prior to or subsequent to germination.

These herbicides are not usually applied in neat form, more efficient use being obtained by the use of formulations which include in addition to the alpha-chloro-acetamides various conditioning agents which enhance the activity or adapt it for use with conventional machinery for treating plant or soil surfaces.

The solid formulations, frequently referred to as "dusts" may contain in addition to the active ingredient, diluents or extenders, dispersing agents to prevent local high concentrations, and agents to facilitate distribution in soil or soil waters. Suitable solid diluents are those which render the compositions permanently dry and free flowing. Thus hygroscopic materials are to be avoided unless the compositions also contain a separate substance to serve as an aid to the flowability. Effective solid diluents, preferably pulverulent or granular in form so as to be effective carriers for the active ingredient, are the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 98 percent by weight, of the entire formulation as applied to plant or soil. More concentrated herbicides will require dilution by the user in order to properly condition the soil for the most effective usage. The concentrated solid herbicidal formulations can be used with less danger if it is mixed with the surface soil by means of a disk-plow or harrow at the time of application.

The liquid compositions for herbicidal use may be solutions, or other liquid dispersions. The choice of a liquid medium will depend to some extent upon the physical properties of the active ingredient. The N-substituted alpha-haloacetamides may be water-soluble and mere dissolution will then provide a usable formulation. Often the N-substituted alpha-haloacetamides are only limitedly soluble in water and, therefore, aqueous formulations will necessarily be dispersions of minute drops of the water-insoluble substances in suspension in an aqueous medium. The known water-insoluble substituted alpha-haloacetamides of this invention may first be dissolved in a suitable organic solvent and the organic solution of the active ingredient then incorporated in water or in any aqueous medium to produce a heterogeneous dispersion of the active ingredient in water.

One composition which aids in the effectivity of the herbicidal component is a surface active agent which serves in providing uniform dispersions of all formulation components of both solid and liquid types, and may be anionic, cationic or non-ionic types and includes conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent are found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

A useful formulation of the herbicidal compositions may involve the solid or liquid concentrate of the active ingredient to which has been added formulation aids or conditioning agents so that the concentrates may be mixed with a suitable extender or diluent in the field at the time of use. Obviously, for this purpose the dispersing agents will be present in larger concentrations so that upon dilution with water or a solid extender, compositions, containing optimum proportions of dispersing agents and active component, will be prepared. The solid or liquid formulations are preferably applied by mechanical equipment involving spraying or spreading the formulation on soil or plant surfaces being treated. For this purpose readily flowable compositions are required, either liquid or solid in physical state. Thus a critical aspect of the invention is the fluent carrier without which the optimum herbicidal effects cannot be achieved. Both the solid and the liquid formulations above described are useful in the application of herbicides because they facilitate the uniform distribution and aid in the destruction of undesirable plants by maintaining the active ingredient in a form which enables the prompt assimilation by the plant and the efficient utilization of its weed destroying properties. The described conditioning agents enable the proper use to achieve the desired herbicidal effects by an unskilled operator without elaborate equipment.

In addition to the above described herbicide conditioning agents other adjuvants may be added, such as insecticides, fungicides, nematocides and other herbicides. By the use of the subject compounds at the low grass specific levels of application, substantial benefits can be obtained by the addition thereto of a broad leaf specific herbicide, for example, 2,4-dichlorophenoxy acetic acid and the corresponding esters, amine salts and alkali metal salts, trichlorobenzoic acid and derivatives thereof, such as trichlorobenzyl chloride and trichloro-toluene. In this manner, formulations of efficient and effective use can be provided.

This application is a continuation-in-part of application Serial No. 389,493, filed October 30, 1953, application Serial No. 455,737, filed September 13, 1954, and application Serial No. 724,826, filed March 31, 1958, all now abandoned.

What is claimed is:

1. The method of selectively inhibiting the germination of grass seeds in contact with soil and the preemergence growth thereof in the presence of growing crops which comprises treating the said soil with a herbicidal amount of the compound of the structure:

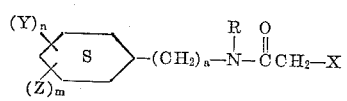

wherein R is a radical selected from the group consisting of the hydrogen atom, alkyl radicals having up to six carbon atoms; alkenyl radicals having up to six carbon atoms, alkynyl radicals having up to six carbon atoms, halo-substituted alkyl radicals having up to six carbon atoms, halo-substituted alkenyl radicals having up to six carbon atoms and halo-substituted alkynyl radicals having up to six carbon atoms; wherein X is a halogen atom; wherein Y is an alkyl radical having up to four carbon atoms; wherein Z is a halogen atom; wherein each of the $n$ and $m$ symbols are integers from zero (0) to five (5) inclusive provided that the sum of $n$ and $m$ does not exceed five, and wherein $a$ is an integer from zero (0) to one (1).

2. The method of selectively inhibiting the germination and preemergent growth of grasses from seeds in contact with soil which comprises treating the said soil with a herbicidal amount consisting of from one to 15 pounds per acre of the compound having the structure:

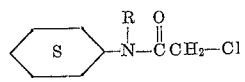

wherein R is an aliphatic hydrocarbon radical having up to six carbon atoms.

3. The method of selectively inhibiting the germination and preemergent growth of grasses from seeds in contact with soil which comprises treating the said soil with a herbicidal amount consisting of from one to 15 pounds per acre of the compound having the structure:

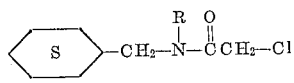

wherein R is an aliphatic hydrocarbon radical having up to six carbon atoms.

4. The method of selectively inhibiting the germination of grass seeds in contact with soil and the preemergence growth thereof in the presence of growing crops which comprises treating the said soil with a herbicidal amount of alpha-chloro-N-cyclohexyl acetamide.

5. The method of selectively inhibiting the germination of grass seeds in contact with soil and the preemergence growth thereof in the presence of growing crops which comprises treating the said soil with a herbicidal amount of alpha-chloro-N-cyclohexyl N-ethyl acetamide.

6. The method of selectively inhibiting the germination of grass seeds in contact with soil and the preemergence growth thereof in the presence of growing crops which comprises treating the said soil with a herbicidal amount of alpha-chloro-N-cyclohexylmethyl acetamide.

7. The method of selectively inhibiting the germination of grass seeds in contact with soil and the preemergence growth thereof in the presence of growing crops which comprises treating the said soil with a herbicidal amount of alpha-chloro-N-cyclohexyl-N-allyl acetamide.

8. The method of selectively inhibiting the germination of grass seeds in contact with soil and the preemergence growth thereof in the presence of growing crops which comprises treating the said soil with a herbicidal amount of alpha-chloro-N-cyclohexyl-N-propyl acetamide.

9. The method of selectively inhibiting the germination and preemergent growth of grasses from seeds in contact with soil which comprises treating the said soil with a herbicidal amount consisting of from one to 15 pounds per acre of alpha-chloro-N-cyclohexyl acetamide.

10. The method of selectively inhibiting the germination and preemergent growth of grasses from seeds in contact with soil which comprises treating the said soil with a herbicidal amount consisting of from one to 15 pounds per acre of alpha-chloro-N-cyclohexyl-N-ethyl acetamide.

11. The method of selectively inhibiting the germination and preemergent growth of grasses from seeds in contact with soil which comprises treating the said soil with a herbicidal amount consisting of from one to 15 pounds per acre of alpha-chloro-N-cyclohexylmethyl acetamide.

12. The method of selectively inhibiting the germination and preemergent growth of grasses from seeds in contact with soil which comprises treating the said soil with a herbicidal amount consisting of from one to 15 pounds per acre of alpha-chloro-N-cyclohexyl-N-allyl acetamide.

13. The method of selectively inhibiting the germination and preemergent growth of grasses from seeds in contact with soil which comprises treating the said soil with a herbicidal amount consisting of from one to 15 pounds per acre of alpha-chloro-N-cyclohexyl-N-propyl acetamide.

References Cited in the file of this patent

UNITED STATES PATENTS 2,636,816    Stewart _____ Apr. 28, 1953